(12) United States Patent
Major

(10) Patent No.: US 11,936,929 B2
(45) Date of Patent: Mar. 19, 2024

(54) REMOTE STORAGE DIGITAL VIDEO RECORDER AND CONTENT DELIVERY NETWORK FUNCTIONALITY USING SHARED NETWORK BANDWIDTH

(71) Applicant: SLING MEDIA L.L.C., Foster City, CA (US)

(72) Inventor: Robert Drew Major, Orem, UT (US)

(73) Assignee: Sling Media L.L.C., Foster City, CA (US)

( * ) Notice: Subject to any disclaimer, the term of this patent is extended or adjusted under 35 U.S.C. 154(b) by 0 days.

(21) Appl. No.: 18/159,558

(22) Filed: Jan. 25, 2023

(65) Prior Publication Data

US 2023/0239522 A1     Jul. 27, 2023

Related U.S. Application Data

(60) Provisional application No. 63/267,165, filed on Jan. 26, 2022.

(51) Int. Cl.
| | |
|---|---|
| *H04N 21/2385* | (2011.01) |
| *H04N 21/2187* | (2011.01) |
| *H04N 21/231* | (2011.01) |
| *H04N 21/239* | (2011.01) |
| *H04N 21/24* | (2011.01) |
| *H04N 21/2747* | (2011.01) |

(52) U.S. Cl.
CPC ..... *H04N 21/2385* (2013.01); *H04N 21/2187* (2013.01); *H04N 21/23106* (2013.01); *H04N 21/2393* (2013.01); *H04N 21/2402* (2013.01); *H04N 21/2747* (2013.01)

(58) Field of Classification Search
CPC .......... H04N 21/2385; H04N 21/2187; H04N 21/23106; H04N 21/2393; H04N 21/2402; H04N 21/2747; H04N 21/26216; H04N 21/47202; H04L 65/612; H04L 65/80
See application file for complete search history.

(56) References Cited

U.S. PATENT DOCUMENTS

2007/0053293 A1\*  3/2007  McDonald ................ H04J 1/16

\* cited by examiner

*Primary Examiner* — Anthony Bantamoi
(74) *Attorney, Agent, or Firm* — KW Law, LLP

(57) ABSTRACT

A digital content storage and delivery system (DCSDS) includes a network interface to communicate data between the DCSDS and a destination device via a network data communication link having limited bandwidth. An input interface receives digital content for handling by the DCSDS. A storage architecture stores recorded video content on behalf of subscriber end users for on-demand playback via the network data communication link, and it caches live streaming video content for distribution via the network data communication link. The DCDS may monitor bandwidth usage of the network data communication link, determine current bandwidth demand for playback of recorded video content stored at the storage architecture, and reserve at least some of the limited bandwidth of the network data communication link to satisfy the determined current bandwidth demand. The available bandwidth is allocated to support distribution of live streaming video from the DCSDS.

20 Claims, 5 Drawing Sheets

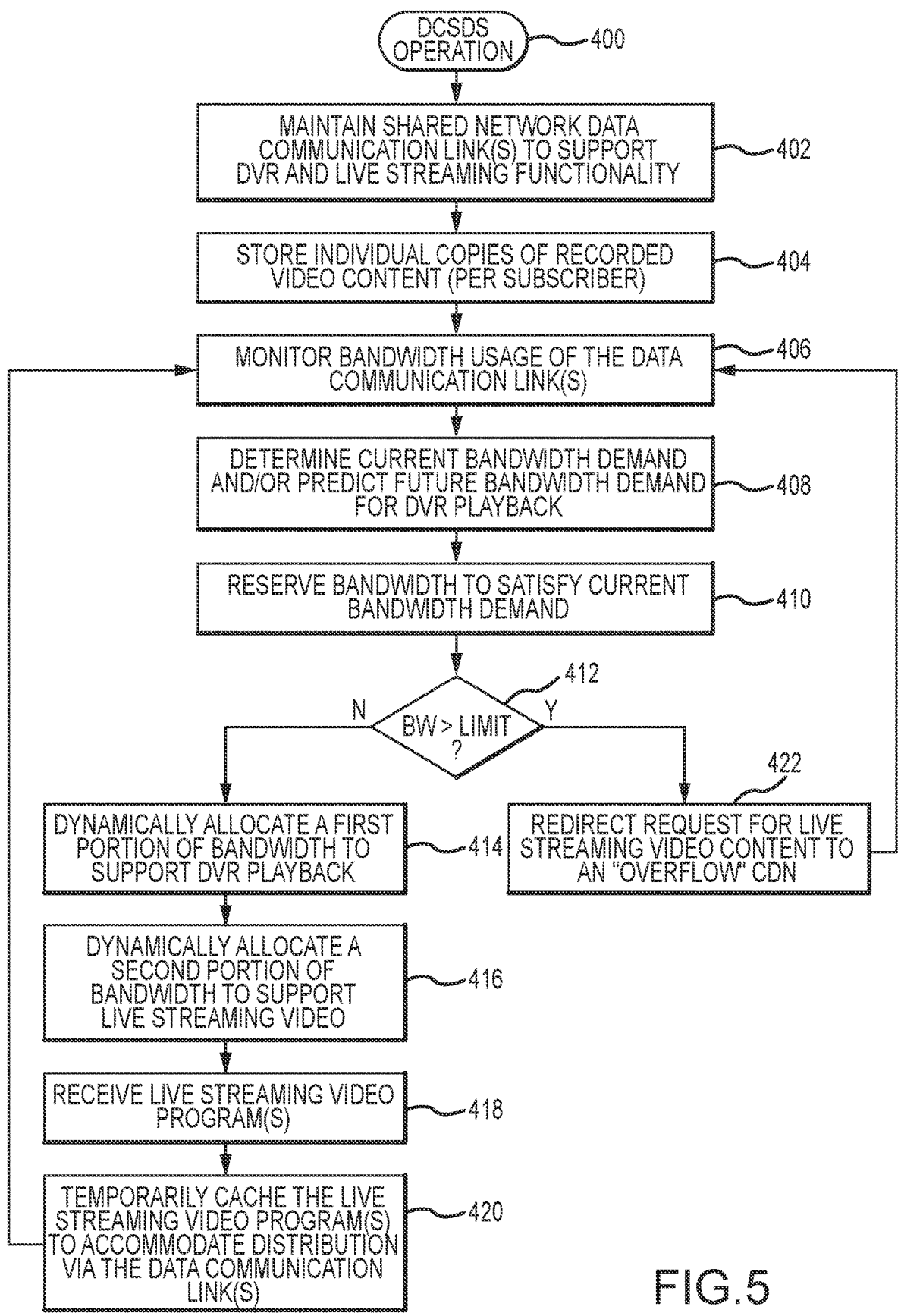

REMOTE STORAGE DIGITAL VIDEO RECORDER AND CONTENT DELIVERY NETWORK FUNCTIONALITY USING SHARED NETWORK BANDWIDTH

CROSS-REFERENCE TO RELATED APPLICATIONS

This application claims priority to U.S. Provisional Application No. 63/267,165 filed on Jan. 26, 2022 and entitled "INTEGRATED SYSTEM THAT PROVIDES REMOTE STORAGE DIGITAL VIDEO RECORDER AND CONTENT DELIVERY NETWORK FUNCTIONALITY USING SHARED NETWORK BANDWIDTH," which is incorporated herein by reference.

TECHNICAL FIELD

Embodiments of the subject matter described herein relate generally to systems and methodologies for delivering content (such as video content) over a data communication network. More particularly, embodiments of the subject matter relate to a cloud-based system that provides remote storage digital video recorder (RS-DVR) functionality and content delivery network functionality in an integrated manner using shared network bandwidth.

BACKGROUND

Live video streaming services and video on demand (VOD) services allow viewers to obtain television programs, movies, sports, and other types of video content directly over the Internet or a similar network. Most VOD services maintain large libraries of video content to ensure an interesting variation of programming for their customers. As the number of available media programs increases, however, additional costs are typically incurred for processing and storing the additional content. Generally speaking, each available program is encoded, packaged, checked for quality, and stored before it is made available to viewers. Each of these steps can require expensive computing and storage resources. Moreover, most modern VOD systems make use of content delivery networks (CDNs) to "locally" store media content for convenient delivery to viewers in widely-varying geographic locations.

Remote storage digital video recorder (RS-DVR) systems (also referred to as "cloud DVR" systems) are utilized to store recorded video programming on behalf of end users. In this regard, an RS-DVR system can be utilized as an alternative to traditional DVRs that are deployed and located at end user sites. An RS-DVR system can remotely provide content recording and playback capabilities to any number of subscribers and end users (similar to a video-on-demand system). In practice, therefore, an RS-DVR system can communicate with different subscriber systems via a data communication network.

BRIEF SUMMARY

A digital content storage and delivery system (DCSDS) is disclosed here. An embodiment of the DCSDS includes: a network interface to communicate data between the DCSDS and at least one destination device, via at least one network data communication link having limited bandwidth; an input interface to receive digital content for handling by the DCSDS; a storage architecture to store recorded video content on behalf of subscriber end users for on-demand playback via the at least one network data communication link, and to cache live streaming video content for distribution via the at least one network data communication link; at least one processor; and at least one processor-readable medium associated with the at least one processor, the at least one processor-readable medium storing processor-executable instructions configurable to be executed by the at least one processor to perform a method that involves: monitoring bandwidth usage of the at least one network data communication link; determining current bandwidth demand for playback of recorded video content stored at the storage architecture; reserving at least some of the limited bandwidth of the at least one network data communication link to satisfy the determined current bandwidth demand, resulting in reserved bandwidth and available bandwidth; and allocating the available bandwidth to support distribution of live streaming video from the DCSDS, via the at least one network data communication link.

Also disclosed herein is an automated method executed by a DCSDS configured to store recorded video content on behalf of subscriber end users for on-demand playback via at least one network data communication link, and configured to cache live streaming video content for distribution via the at least one network data communication link. Embodiments of the disclosed method involve: monitoring bandwidth usage of the at least one network data communication link, wherein the at least one network data communication link has limited bandwidth; determining current bandwidth demand for playback of recorded video content stored at a storage architecture of the DCSDS; reserving at least some of the limited bandwidth of the at least one network data communication link to satisfy the determined current bandwidth demand, resulting in reserved bandwidth and available bandwidth; and allocating the available bandwidth to support distribution of live streaming video from the DCSDS, via the at least one network data communication link.

Also disclosed herein is an exemplary embodiment of a DCSDS having: a network interface to communicate data between the DCSDS and at least one destination device, via at least one network data communication link having limited bandwidth; an input interface to receive digital content for handling by the DCSDS; and a storage architecture to store recorded video content on behalf of subscriber end users for on-demand playback via the at least one network data communication link, and to receive live streaming video content for distribution to viewing end users via the at least one network data communication link. The limited bandwidth of the at least one network data communication link is shared to support the on-demand playback of the recorded video content and to support distribution of the live streaming video content. The DCSDS is configured to dynamically allocate a first portion of the limited bandwidth of the at least one network data communication link to support the on-demand playback of the recorded video content from the DCSDS, and to dynamically allocate a second portion of the limited bandwidth of the at least one network data communication link to support distribution of the live streaming video from the DCSDS.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

BRIEF DESCRIPTION OF THE DRAWINGS

A more complete understanding of the subject matter may be derived by referring to the detailed description and claims when considered in conjunction with the following figures, wherein like reference numbers refer to similar elements throughout the figures.

FIG. 5 is a flow chart that illustrates an exemplary embodiment of a process for operating a DCSDS.

DETAILED DESCRIPTION

The following detailed description is merely illustrative in nature and is not intended to limit the embodiments of the subject matter or the application and uses of such embodiments. As used herein, the word "exemplary" means "serving as an example, instance, or illustration." Any implementation described herein as exemplary is not necessarily to be construed as preferred or advantageous over other implementations. Furthermore, there is no intention to be bound by any expressed or implied theory presented in the preceding technical field, background, brief summary or the following detailed description.

Techniques and technologies may be described herein in terms of functional and/or logical block components, and with reference to symbolic representations of operations, processing tasks, and functions that may be performed by various computing components or devices. Such operations, tasks, and functions are sometimes referred to as being computer-executed, computerized, software-implemented, or computer-implemented. It should be appreciated that the various block components shown in the figures may be realized by any number of hardware, software, and/or firmware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices.

For the sake of brevity, conventional techniques and methodologies related to signal processing, data transmission, signaling, network control, video storage, video encoding and decoding, video playback, and other functional aspects of the systems (and the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in an embodiment of the subject matter.

Figure 1:
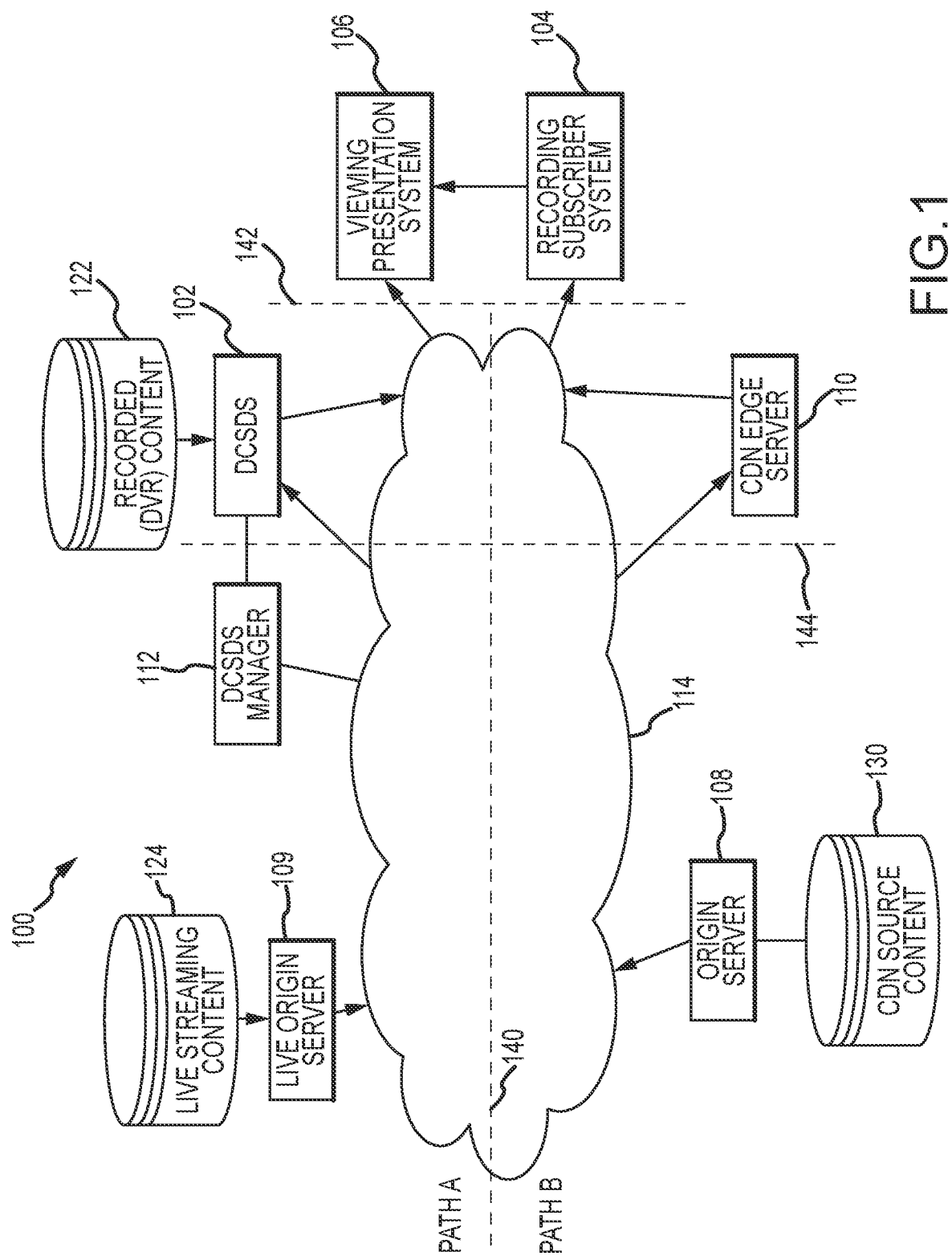
FIG. 1 is a schematic representation of an exemplary embodiment of a content delivery system.

FIG. 1 is a schematic representation of an exemplary embodiment of a content delivery system 100 that is configured and arranged to accommodate the delivery of digital content (e.g., video content) to end users. The illustrated embodiment of the content delivery system 100 generally includes, without limitation: at least one digital content storage and delivery system (DCSDS) 102; at least one end user system, which may include at least one recording subscriber system 104 and at least one viewing presentation system 106; at least one origin server 108; at least one live origin server 109; and at least one content delivery network (CDN) edge server 110. Although not always required, the illustrated embodiment of the system 100 includes a DCSDS manager 112 to manage, control, or otherwise regulate the operation of the DCSDS 102.

The system 100 includes or cooperates with at least one data communication network 114 that facilitates communication between the various components, systems, and logic utilized by the system 100. For example, the data communication network 114 is utilized for the communication of media content (e.g., recorded video content and live streaming video content) from the DCSDS 102 or the CDN edge server 110 to the end user systems as needed. The network 114 may support wireless data communication and/or data communication using tangible data communication links. FIG. 1 depicts network communication links in a simplified manner. In practice, the system 100 may cooperate with and leverage any number of wireless and any number of wired data communication networks maintained or operated by various entities and providers. Accordingly, communication between the various components of the system 100 may involve multiple network links and different data communication protocols. In this regard, the network can include or cooperate with any of the following, without limitation: a local area network; a wide area network; the Internet; a personal area network; a near-field data communication link; a cellular communication network; a satellite communication network; a video services or television broadcasting network; a network onboard a vehicle; or the like. The components of the system 100 may be suitably configured to support a variety of wireless and wired data communication protocols, technologies, and techniques as needed for compatibility with the network 114.

An end user system (e.g., a recording subscriber system 104 or a viewing presentation system 106) may be realized in any number of different ways, and it may be suitably configured as needed to perform any number of desired functions, such as the presentation of audio content, video content, or audio-visual content. For example, an end user system may be implemented as any of the following, without limitation: a computing device; a video game device; a smartphone; a tablet device; an electronic medical device; a household or other electronic appliance; a digital media player device; a digital media place-shifting device; a television set; a set top box for a video services receiver; stereo or other entertainment equipment; an alarm clock; a wearable device; or the like. These examples are not intended to limit or otherwise restrict the scope of the embodiments described herein.

The DCSDS 102 may be implemented as a server to provide "cloud" hosted storage of recorded video content for end users, and to distribute additional digital content (in particular, live streaming video content) to end users. In this regard, the DCSDS 102 is designed, configured, and operated to function like a cloud-based RS-DVR system having CDN functionality. Notably, the DCSDS 102 utilizes at least one network data communication link (which may have limited usable bandwidth) as a shared resource to support RS-DVR and CDN functionality. Although only one DCSDS 102 is depicted in FIG. 1, an embodiment of the system can include more than one DCSDS 102 to service different geographical regions, locales, time zones, or the like.

The DCSDS 102 includes or cooperates with a suitably arranged storage architecture, which may be realized with one or more hardware components, memory storage devices (e.g., hard disk drives or solid-state memory), database systems, or the like. The storage architecture is configured, maintained, and operated to store recorded video content on behalf of subscriber end users for on-demand playback via the DCSDS 102, using the shared network bandwidth of the DCSDS 102 to deliver recorded video content over at least one network data communication link. The storage architecture is also configured, maintained, and operated to store or cache live streaming video content to support and accommodate distribution of live streaming video programs via the DCSDS 102, using the shared network bandwidth of the DCSDS 102. For ease of understanding, the storage architecture depicted in FIG. 1 includes storage 122 for recorded (DVR) content and storage 124 for live streaming content. An embodiment of the DCSDS 102, however, may include or cooperate with a storage element that stores both recorded video content and live streaming video content. Moreover, an embodiment of the DCSDS 102 may include or cooperate with any number of storage elements or databases as needed to store live streaming content and recorded content for the volume of end users or subscribers supported by the DCSDS 102.

In certain implementations, the storage architecture stores individual copies of recorded video content on a subscriber-by-subscriber basis. In this regard, the DCSDS 102 is operated to make as many copies of a video program as there are subscribers requesting to record that program. Each subscriber has, in effect, their own portion of storage space that contains their individual copy of the recorded video content. On playback, the respective end user system requests recorded video from the DCSDS 102 and specifies which individual subscriber is requesting it (so that the DCSDS 102 can find the appropriate version of the recorded content). The recorded video content is returned to the requesting end user system via the network 114. The video data can be marked as being non-cacheable to ensure that the personalized video copy is only delivered to the requesting end user system. In this way the RS-DVR video storage and delivery scheme does not run afoul of copyright law. In other embodiments, where copyright law is not of the same concern, the DCSDS 102 may instead utilize one copy of a particular video for multiple users. For example, one copy may be used for all users or multiple copies may distributed across multiple storage devices or servers that serve some subset of users.

The storage architecture can also be utilized to temporarily cache single copies of live streaming video content for distribution to one or more viewing end users. In other words, one cached version of a requested video program can be provided to any number of end user systems. Temporary caching a received live streaming video program allows the DCSDS 102 to distribute the received program to multiple end user systems, via the network 114.

The DCSDS manager 112 may be implemented as a distinct server and/or as a native feature of the DCSDS 102. The DCSDS manager 112 monitors and regulates the operation of the DCSDS 102. In certain embodiments, the DCSDS manager 112 also monitors and regulates the operation of one or more additional DCSDSs (not shown in FIG. 1). Although only one DCSDS manager 112 is depicted in FIG. 1, an embodiment of the system 100 can include more than one DCSDS manager 112 to handle any number of defined groups of DCSDSs. As explained in more detail below, the DCSDS manager 112 can be implemented to monitor the bandwidth usage of the network data communication link(s) utilized by the DCSDS 102, and to allocate the shared network resources in an appropriate manner to support both the playback of recorded video content and the distribution of live streaming video from the DCSDS 102.

The origin server 108 and the CDN edge server 110 cooperate to provide traditional CDN features for users of the system 100. Accordingly, some video programs may be encoded in advance of delivery and stored in storage 130 utilized for CDN source content. The origin server 108 can provide stored video programs to the CDN edge server 110 as needed for distribution to end users serviced by the CDN edge server 110. Other content, such as live streaming video programs, are encoded and/or packaged on an as-needed basis by retrieving the content from the origin server 108 or from the live origin server 109 for processing and delivery in real-time or substantially real-time (e.g., delayed by a few seconds) to end users via the CDN edge server 110. In this manner, live streaming video content may be temporarily maintained in cache storage associated with the CDN edge server 110 for an appropriate period of time to quickly service additional requests for the same content.

This description assumes that the CDN edge server 110 is deployed, maintained, and operated in connection with a CDN that is distinct from the DCSDS 102. For example, the DCSDS 102 may be owned/operated by one company or entity, and the CDN edge server 110 may be owned/operated by a different company or entity (i.e., a third-party provider). Moreover, the DCSDS 102 also provides CDN features and functionality by leveraging the network resources that are also available for supporting the RS-DVR features of the DCSDS 102. Accordingly, the DCSDS 102 communicates and cooperates with the live origin server 109 and the storage 124 as needed to retrieve and distribute live video content to end users in the manner described above. Thus, the DCSDS 102 or the CDN edge server 110 can serve as the "local" distribution point for video content consumed by end users, such as live streaming video programming. In certain embodiments, the DCSDS 102 leverages available bandwidth of the shared network data communication link(s) to support its native CDN operation. If, however, the amount of available bandwidth cannot adequately support the CDN features, then the DCSDS 102 can redirect requests for content to the third-party CDN such that the CDN edge server 110 can provide the requested content to the requesting end user(s). In this way, the DCSDS 102 can take advantage of the available bandwidth of its network data communication link(s), some of which may otherwise be "wasted" during certain periods of time when the DCSDS 102 isn't servicing a high volume of requests for recorded video content.

FIG. 1 includes dashed and dotted lines that graphically depict certain regions and content delivery paths supported by the network 114. The horizontal dashed line 140 separates content delivery path A (above the line 140) from content delivery path B (below the line 140). In this regard, the content delivery path A generally corresponds to the delivery of video content to an end user system via the DCSDS 102. In contrast, the content delivery path B generally corresponds to the delivery of video content to an end user system via the CDN edge server 110. The vertical dotted line 142 separates the network 114 from the end user systems. Accordingly, the recording subscriber system 104 and the viewing presentation system 106 may be considered to be components of an end user's home network. The vertical dotted line 144 graphically depicts the edge portion of the network 114, which includes systems and components that are relatively close and local to the end user systems. For this example, the DCSDS 102 and the CDN edge server 110 are in close proximity to the end user systems and, therefore, are associated with the edge portion of the network 114.

Figure 2:
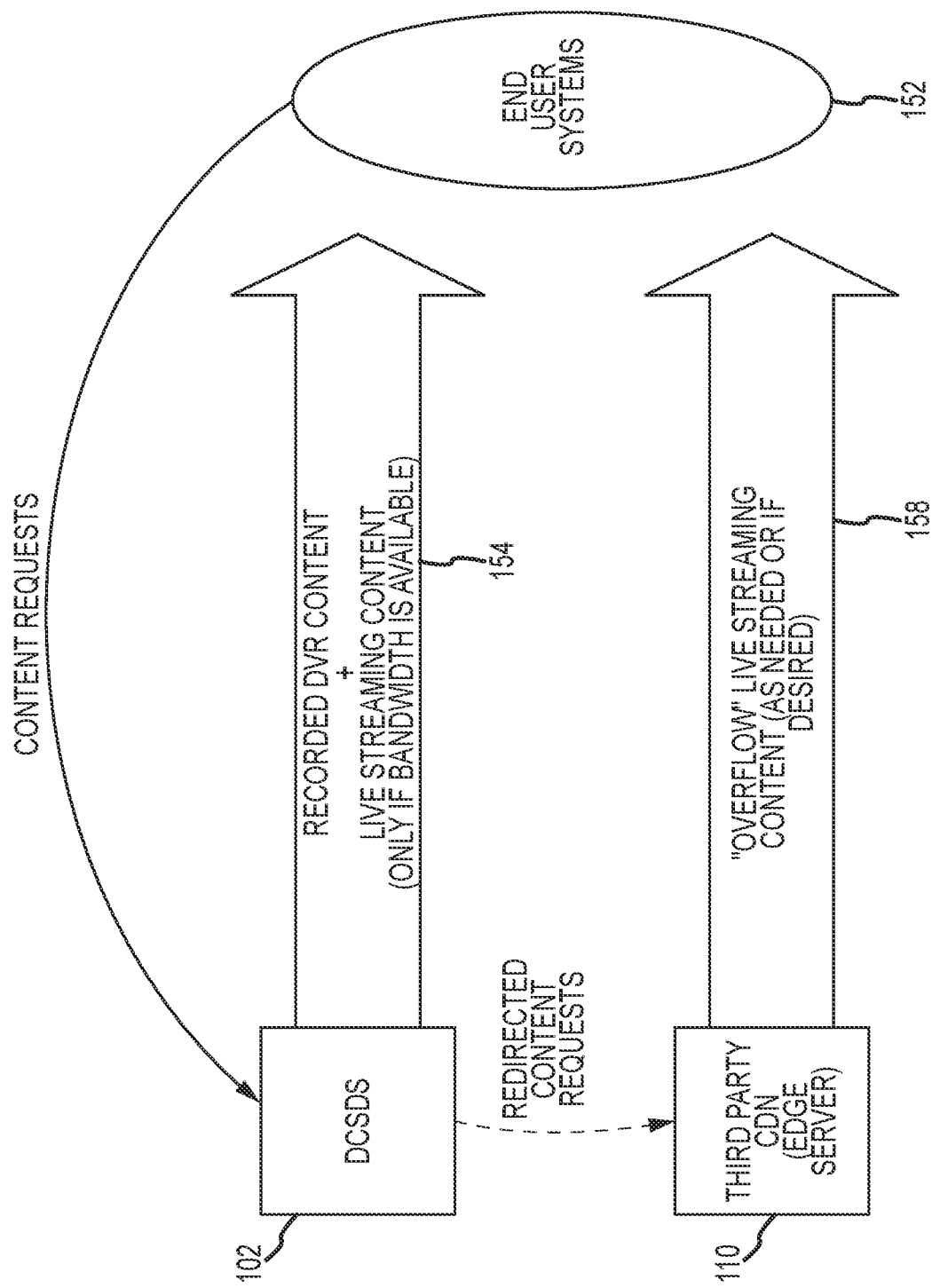
FIG. 2 is a diagram that illustrates network data communication links configured to deliver video content to end users.

FIG. 2 is a diagram that illustrates network data communication links configured to deliver video content to end users. FIG. 2 shows the DCSDS 102 and the edge server 110 servicing end user systems 152, which may include recording subscriber systems 104 and/or viewing presentation systems 106 (see FIG. 1). FIG. 2 depicts at least one shared network data communication link 154 that is utilized to deliver recorded DVR content to the end user systems 152. The at least one shared network data communication link 154 is also utilized to distribute live streaming video content to the end user systems 152 (only when sufficient bandwidth is available and allocated to such usage). Content requests that originate from the end user systems 152 are received and processed by the DCSDS 102 or the DCSDS manager 112 (see FIG. 1) in an appropriate manner to deliver recorded video content or live streaming video content to the requesting end user systems 152.

As explained in more detail below, the DCSDS 102 or the DCSDS manager 112 can redirect content requests (received from the end user systems 152) as needed or as desired, e.g., for load balancing, for failover protection, and/or to intelligently allocate and use the available resources of the shared network data communication link 154. In certain implementations, redirected content requests are issued to initiate action by the CDN edge server 110. More specifically, a redirected content request can be serviced by the CDN edge server 110 (rather than by the DCSDS 102). Accordingly, the CDN edge server 110 can deliver "overflow" live streaming video content to the end user systems 152 as needed. FIG. 2 depicts the CDN edge server 110 distributing live streaming content to the end user systems 152 via at least one network data communication link 158. Notably, the at least one network data communication link 158 utilized by the CDN edge server 110 is distinct and distinguishable from the at least one network data communication link 154 utilized by the DCSDS 102. Thus, the DCSDS 102 can rely on the additional network resources provided by a third party CDN on an as-needed basis, to supplement the limited network bandwidth that might be available to the DCSDS 102.

Figure 3:
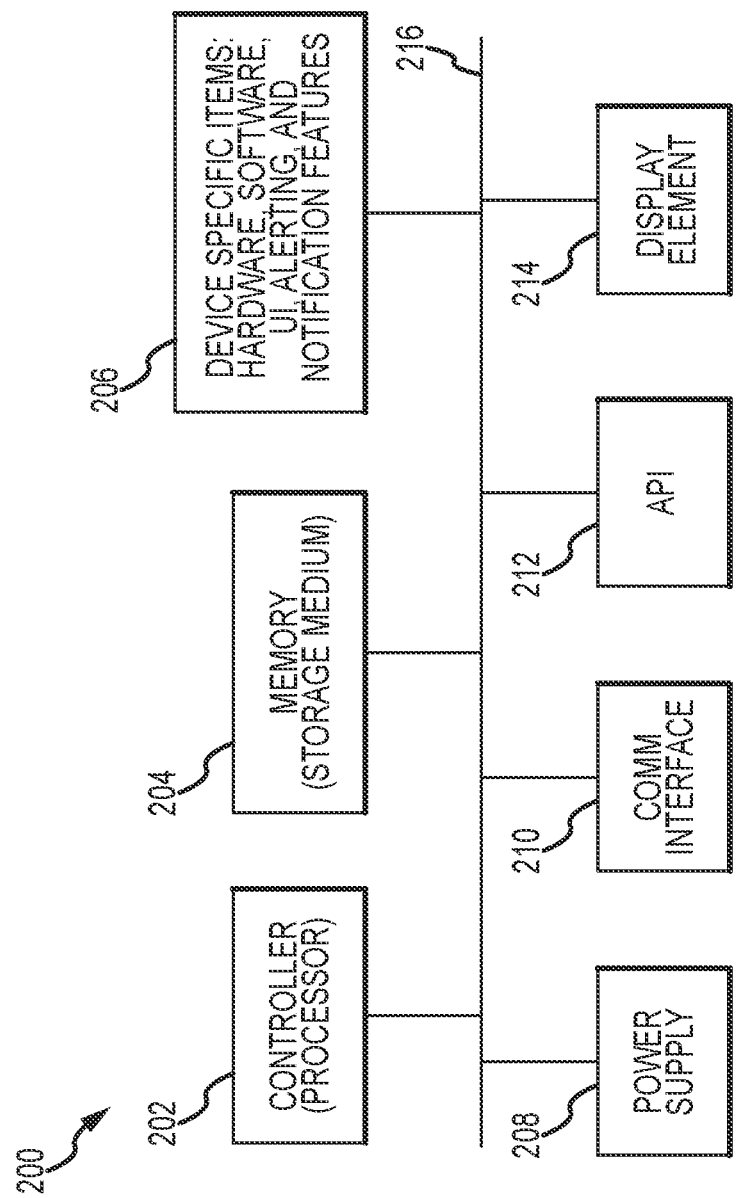
FIG. 3 is a block diagram representation of an exemplary embodiment of a computer-based or processor-based device suitable for deployment in the system shown in FIG. 1.

In accordance with certain embodiments, any of the hardware components shown in FIG. 1 can be implemented as a computer-based or a processor-based device, system, or piece of equipment having suitably configured hardware and software written to perform the functions and methods needed to support the features described herein. In this regard, FIG. 3 is a simplified block diagram representation of an exemplary embodiment of a computer-based or processor-based device 200 that is suitable for deployment in the system 100 shown in FIG. 1.

The illustrated embodiment of the device 200 is intended to be a high-level and generic representation of one suitable platform. In this regard, any computer-based or processor-based component of the system 100 can utilize the architecture of the device 200. The illustrated embodiment of the device 200 generally includes, without limitation: at least one controller (or processor) 202; a suitable amount of memory 204 that is associated with the at least one controller 202; device-specific items 206 (which may include, without limitation: hardware, software, firmware, user interface (UI), alerting, and notification features); a power supply 208 such as a disposable or rechargeable battery; a communication interface 210; at least one application programming interface (API) 212; and a display element 214. Of course, an implementation of the device 200 may include additional elements, components, modules, and functionality configured to support various features that are unrelated to the primary subject matter described here. For example, the device 200 may include certain features and elements to support conventional functions that might be related to the particular implementation and deployment of the device 200. In practice, the elements of the device 200 may be coupled together via at least one bus or any suitable interconnection architecture 216.

The at least one controller 202 may be implemented or realized with a general-purpose processor, a content addressable memory, a microcontroller unit, a digital signal processor, an application specific integrated circuit, a field programmable gate array, any suitable programmable logic device, discrete gate or transistor logic, discrete hardware components, or any combination designed to perform the functions described here. Moreover, the at least one controller 202 may be implemented as a combination of computing devices, e.g., a combination of a digital signal processor and a microprocessor, a plurality of microprocessors, one or more microprocessors in conjunction with a digital signal processor core, or any other such configuration.

The memory 204 may be realized as at least one memory element, device, module, or unit, such as: RAM memory, flash memory, EPROM memory, EEPROM memory, registers, a hard disk, a removable disk, a CD-ROM, or any other form of storage medium known in the art. In this regard, the memory 204 can be coupled to the at least one controller 202 such that the at least one controller 202 can read information from, and write information to, the memory 204. In the alternative, the memory 204 may be integral to the at least one controller 202. As an example, the at least one controller 202 and the memory 204 may reside in an ASIC. At least a portion of the memory 204 can be realized as a computer storage medium that is operatively associated with the at least one controller 202, e.g., a tangible, non-transitory computer-readable medium having computer-executable instructions stored thereon. The computer-executable instructions are configurable to be executed by the at least one controller 202 to cause the at least one controller 202 to perform certain tasks, operations, functions, and processes that are specific to the particular embodiment. In this regard, the memory 204 may represent one suitable implementation of such computer-readable media. Alternatively or additionally, the device 200 could receive and cooperate with computer-readable media (not separately shown) that is realized as a portable or mobile component or platform, e.g., a portable hard drive, a USB flash drive, an optical disc, or the like.

The device-specific items 206 may vary from one embodiment of the device 200 to another. For example, the device-specific items 206 will support: general computer system operations when the device 200 is realized as a server; smartphone features and functionality when the device 200 is realized as a smartphone; set-top box features and functionality when the device 200 is realized as a set-top box or other type of video services receiver; television or monitor device features and functionality when the device is realized as a television/monitor device; etc. In practice, certain portions or aspects of the device-specific items 206 may be implemented in one or more of the other blocks depicted in FIG. 3.

If present, the UI of the device 200 may include or cooperate with various features to allow a user to interact with the device 200. Accordingly, the UI may include various human-to-machine interfaces, e.g., a keypad, keys, a keyboard, buttons, switches, knobs, a touchpad, a joystick, a pointing device, a virtual writing tablet, a touch screen, a microphone, or any device, component, or function that enables the user to select options, input information, or otherwise control the operation of the device 200. The UI may include one or more graphical user interface (GUI) control elements that enable a user to manipulate or otherwise interact with an application via the display element 214.

The communication interface 210 facilitates data communication between the device 200 and other components as needed during the operation of the device 200. It should be appreciated that the particular configuration and functionality of the communication interface 210 can vary depending on the hardware platform and specific implementation of the device 200. In practice, an embodiment of the device 200 may support wireless data communication and/or wired data communication, using various data communication protocols. For example, the communication interface 210 could support one or more wireless data communication protocols, techniques, or methodologies, including, without limitation: RF; IrDA (infrared); Bluetooth; BLE; ZigBee (and other variants of the IEEE 802.15 protocol); IEEE 802.11 (any variation); IEEE 802.16 (WiMAX or any other variation); Direct Sequence Spread Spectrum; Frequency Hopping Spread Spectrum; cellular/wireless/cordless telecommunication protocols; wireless home network communication protocols; paging network protocols; magnetic induction; satellite data communication protocols; wireless hospital or health care facility network protocols such as those operating in the WMTS bands; GPRS; and proprietary wireless data communication protocols such as variants of Wireless USB. Moreover, the communication interface 210 could support one or more wired/cabled data communication protocols, including, without limitation: Ethernet; powerline; home network communication protocols; USB; IEEE 1394 (Firewire); hospital network communication protocols; and proprietary data communication protocols.

The at least one API 212 supports communication and interactions between software applications and logical components that are associated with operation of the device 200. For example, one or more APIs 212 may be configured to facilitate compatible communication and cooperation between different elements of the system 100.

The display element 214 is suitably configured to enable the device 200 to render and display various screens, recommendation messages, alerts, alarms, notifications, GUIs, GUI control elements, drop down menus, auto-fill fields, text entry fields, message fields, or the like. Of course, the display element 214 may also be utilized for the presentation of media content, such as video programming, images, and the like. Notably, the specific configuration, operating characteristics, size, resolution, and functionality of the display element 214 can vary depending upon the implementation of the device 200.

Figure 4:
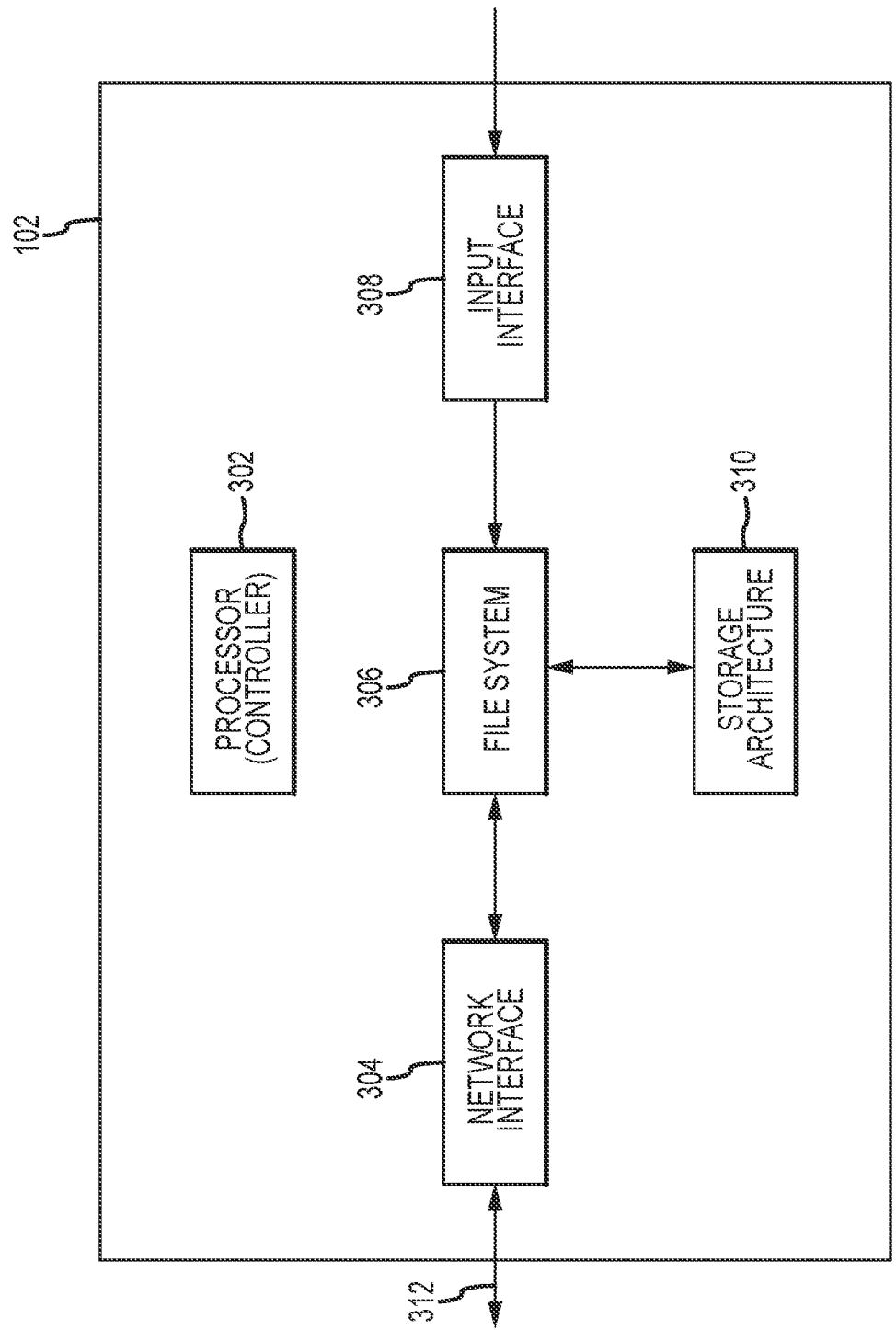
FIG. 4 is a schematic representation of an exemplary embodiment of a digital content storage and delivery system (DCSDS)

FIG. 4 is a schematic representation of an exemplary embodiment of the DCSDS 102 shown in FIG. 1. FIG. 4 depicts some of the primary logical or functional modules of the DCSDS 102 in a simplified block diagram format. The illustrated embodiment of the DCSDS 102 generally includes, without limitation: a processor (controller) 302; a network interface 304 (which can include or be realized as a web server); a file system 306; an input interface 308 to receive digital content for handling by the DCSDS 102; and a storage architecture 310 (which in this exemplary embodiment is realized as a plurality of memory storage devices such as hard disk drives or solid state drives). These elements cooperate to support the various functions and operations of the DCSDS 102.

The processor 302 may cooperate with the network interface 304, the file system 306, the input interface 308, and the storage architecture 310 as needed during operation of the DCSDS 102. Moreover, the processor 302 may be suitably configured to support one or more designated functions of the DCSDS 102. For example, the processor 302 may be designed to execute the various RS-DVR and CDN functions mentioned herein.

The network interface 304 represents hardware, software, firmware, and/or logic that is configured to communicate data between the DCSDS 102 and at least one destination device, component, or element in the system 100, such as an end user system. Referring to FIG. 1, the network interface 304 can be used to deliver recorded video content to the recording subscriber system 104 via at least one network data communication link of the network 114. The network interface can also be used to distribute live streaming video content to the viewing presentation system 106 via the network 114. The arrow 312 in FIG. 4 represents the data communication link between the network interface 304 and the network 114. In certain embodiments, the network interface 304 cooperates with the file system 306 to provide media content files (in the form of encoded media segments) to end user systems in accordance with established HTTP techniques and methodologies.

The file system 306 is utilized to manage, organize, and maintain files in the storage architecture 310. In certain embodiments, the file system 306 can be written to accommodate multiple bitrate encoded media segments that are stored in a distributed manner across a plurality of hard disks of the storage architecture 310. The file system 306 also cooperates with the input interface 308 to accommodate the recording and storage of encoded media segments as needed during the operation of the DCSDS 102. The input interface 308 may be coupled to the file system 306 to receive encoded media segments that represent media content files encoded at a plurality of different bitrates. The input interface 308 is capable of receiving multicast delivered media segments and/or unicast delivered media segments from an appropriate content source. The input interface 308 and the file system 306 may also cooperate to receive and manage live streaming video content intended for distribution to end users.

The storage architecture 310 is coupled to the file system 306 to store encoded media segments that can be subsequently accessed for playback to one or more subscriber systems. In certain implementations, the storage architecture 310 includes a plurality of memory storage devices such as hard disk drives or solid-state drives. The memory storage devices are physically distinct and separate units that can be removed and replaced as needed. The file system 306 governs the manner in which the encoded media segments are stored in the different memory storage devices.

During operation, the processor 302, network interface 304, file system 306, input interface 308, and storage architecture 310 cooperate to carry out content recording, content file (media segment) storing, file management, disk management, content playback and distribution, and other functions of the DCSDS 102. These elements of the DCSDS 102 cooperate to provide recorded video content and live streaming video content to the end user systems for presentation using the shared network data communication link(s) utilized by the DCSDS 102.

FIG. 5 is a flow chart that illustrates an exemplary embodiment of a process 400 for operating a DCSDS, such as the DCSDS 102 as described above. The various tasks performed in connection with the process 400 may be performed by software, hardware, firmware, or any combination thereof. It should be appreciated that an embodiment of the process 400 may include any number of additional or alternative tasks, the tasks shown in FIG. 5 need not be performed in the illustrated order, and the process 400 may be incorporated into a more comprehensive procedure or process having additional functionality not described in detail herein. Moreover, one or more of the tasks shown in FIG. 5 could be omitted from an embodiment of the process 400 as long as the intended overall functionality remains intact.

The following description assumes that the DCSDS maintains at least one network data communication link to support RS-DVR and live streaming functionality (task 402). The network data communication link(s) represent a shared resource (bandwidth) that can be allocated as needed to support RS-DVR functions and/or CDN functions. In practice, the network data communication link(s) have limited bandwidth that can be used to support the operation of the DCSDS. For example, the DCSDS may be provisioned with a network data communication link having a fixed maximum bandwidth or data throughput limit. As another example, the DCSDS may utilize a network data communication link for which the owner/operator of the DCSDS is billed in accordance with the amount of data consumed or transmitted per unit of time (daily, weekly, hourly, monthly) and, therefore, imposes limits or restrictions on data consumption. As yet another example, the owner/operator of the DCSDS can be billed in accordance with a tiered scheme such that it becomes important to remain within a cost-efficient billing tier.

Referring again to FIG. 5, the process 400 stores individual copies of recorded video content on a subscriber-by-subscriber basis (task 404). As explained above, it may be necessary to store individual redundant copies of a video program in the storage architecture, to satisfy certain copyright rules, laws, or regulations. Storage and playback of recorded video programs are fundamental aspects of the RS-DVR functionality of the DCSDS.

The process 400 monitors and/or receives information related to the bandwidth (network resources) usage of the network data communication link(s) provisioned for the DCSDS (task 406). Task 406 may be associated with real-time or near real-time network status monitoring, which may leverage any number of conventional methodologies. The process 400 determines the current bandwidth demand for playback of recorded video content stored at the storage architecture of the DCSDS (task 408). In certain embodiments, the current bandwidth demand is measured or calculated in a direct manner. Alternatively or additionally, the bandwidth demand can be predicted or estimated based on any number of factors. For example, the amount of network resources needed to support RS-DVR functionality can be predicted or estimated based on historical statistics associated with end user demand at different time slots, days of the week, months of the year, video program schedules, video program ratings, movie release dates, etc.

The process 400 continues by reserving at least some of the limited bandwidth of the network data communication link(s) to satisfy the current bandwidth demand as previously determined (task 410). In this way, the DCSDS can be controlled and operated to prioritize its RS-DVR functionality by ensuring that the network data communication link(s) remain free to accommodate playback of recorded video content. This allows the DCSDS to intelligently allocate bandwidth as needed to support CDN functionality, e.g., to support the distribution of live streaming video content from the DCSDS.

The process 400 may check whether the current bandwidth demand for playback of recorded video content exceeds a threshold demand amount or limit (query task 412). If the current bandwidth demand for RS-DVR operation does not exceed the threshold limit (the "No" branch of query task 412), then the process 400 continues by allocating the available bandwidth to support the distribution of live streaming video from the DCSDS, via the shared network data communication link(s). In certain embodiments, the process 400 dynamically allocates a first portion of the limited bandwidth of the network data communication link(s) to support playback of recorded video content from the DCSDS (task 414), and dynamically allocates a second portion of the limited bandwidth to support the distribution of live streaming video content from the DCSDS, i.e., to support the CDN functionality of the DCSDS (task 416). Thus, the first and second portions of the limited bandwidth of the network data communication link(s) can be dynamically allocated based at least in part on the determined current bandwidth demand.

This description assumes that there is sufficient network bandwidth available to support both RS-DVR and CDN functionality. Accordingly, the DCSDS can be controlled and operated to receive one or more live streaming video programs from at least one origin server (task 418). In certain embodiments, the DCSDS obtains live streaming video content in response to end user requests. Alternatively or additionally, the DCSDS can receive live streaming video content in anticipation of end user demand, whether or not an actual end user request has been issued. Live streaming video programs received by the DCSDS can be temporarily cached in the storage architecture of the DCSDS (task 420). Caching the live streaming video content is desirable to accommodate the distribution of live streaming video programs to one or more end users, via the shared network data communication link(s). In contrast to the subscriber-by-subscriber storage methodology utilized by the RS-DVR feature, the storage architecture can be controlled and operated to cache single copies of live streaming video content for distribution to any number of viewing end users.

FIG. 5 shows task 420 leading back to task 406, where the process 400 continues monitoring the bandwidth usage of the network data communication link(s). This scheme allows the DCSDS to make efficient and effective use of the available network bandwidth, some of which might otherwise remain unused or be wasted during periods of low demand for RS-DVR playback. Accordingly, "extra" bandwidth that isn't needed to support RS-DVR operation can be utilized to support the CDN operation of the DCSDS.

If the process 400 detects that the current bandwidth demand for playback of recorded video content exceeds the threshold demand amount (the "Yes" branch of query task 412), then appropriate measures can be taken. For example, the DCSDS may start to redirect requests for live streaming video content to a CDN that is distinct from the DCSDS (task 422). Thus, ongoing end user requests for live streaming video programming can be redirected to a third-party service or system in a way that reduces loading of the DCSDS. Alternatively or additionally, the DCSDS may temporarily limit the number of CDN requests it handles, until more network bandwidth becomes available. The DCSDS can also redirect requests to a third-party CDN as needed for failover purposes and/or for load balancing purposes.

FIG. 5 shows task 422 leading back to task 406, where the process 400 continues monitoring the bandwidth usage of the network data communication link(s). Accordingly, if more bandwidth becomes available, then the DCSDS can halt the redirection of requests for live streaming video content and/or service additional requests as needed.

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

What is claimed is:

1. A digital content storage and delivery system (DCSDS) comprising:
   a network interface to communicate data between the DCSDS and a destination device via a communication link having limited bandwidth;
   an input interface to receive digital content for handling by the DCSDS;
   a storage architecture to store recorded video content on behalf of subscriber end users for on-demand playback via the data communication link, and to cache live streaming video content for distribution via the data communication link;
   a processor; and
   a processor-readable storage medium in communication with the processor, the processor-readable medium storing processor-executable instructions that, in response to execution by the processor, cause the DCSDS to perform a method comprising:
      monitoring bandwidth usage of the data communication link;
      determining current bandwidth demand for playback of the recorded video content stored on the storage architecture;
      reserving a first portion of the limited bandwidth of the data communication link to satisfy the current bandwidth demand for playback, with a remainder of the limited bandwidth being available bandwidth; and
      allocating the available bandwidth to support distribution of live streaming video from the DCSDS via the data communication link.

2. The DCSDS of claim 1, wherein the method further comprises:
   receiving a live streaming video program via the input interface and from an origin server; and
   caching the received live streaming video program in the storage architecture temporarily to accommodate distribution of the received live streaming video program, via the data communication link.

3. The DCSDS of claim 1, wherein the method further comprises:
   detecting that the current bandwidth demand for playback of recorded video content exceeds a threshold demand amount; and
   redirecting requests for live streaming video content to a content delivery network (CDN) that is distinct from the DCSDS.

4. The DCSDS of claim 1, wherein the method performed by the processor further comprises:
   dynamically allocating the first portion of the limited bandwidth of the data communication link to support playback of recorded video content from the DCSDS; and
   dynamically allocating a second portion of the limited bandwidth of the data communication link to support distribution of live streaming video from the DCSDS.

5. The DCSDS of claim 1, wherein determining current bandwidth demand for playback comprises measuring the current bandwidth demand.

6. The DCSDS of claim 1, wherein determining current bandwidth demand for playback comprises estimating the current bandwidth demand.

7. The DCSDS of claim 1, wherein:
   the storage architecture stores individual copies of recorded video content on a subscriber-by-subscriber basis; and
   the storage architecture temporarily caches single copies of live streaming video content for distribution to one or more viewing end users.

8. An automated method executed by a digital content storage and delivery system (DCSDS) configured to store recorded video content on behalf of subscriber end users for on-demand playback via a data communication link, and configured to cache live streaming video content for distribution via the data communication link, the method comprising:
   monitoring bandwidth usage of the data communication link, wherein the data communication link has limited bandwidth;
   determining current bandwidth demand for playback of recorded video content stored in a storage architecture of the DCSDS;
   reserving a first portion of the limited bandwidth of the data communication link to satisfy the determined current bandwidth demand, resulting in reserved bandwidth and available bandwidth; and
   allocating the available bandwidth to support distribution of live streaming video from the DCSDS via the data communication link.

9. The method of claim 8, further comprising:
   receiving a live streaming video program from an origin server; and
   temporarily caching the received live streaming video program in the storage architecture to accommodate distribution of the received live streaming video program via the data communication link.

10. The method of claim 8, further comprising:
    detecting that the current bandwidth demand for playback of recorded video content exceeds a threshold demand amount; and
    redirecting requests for live streaming video content to a content delivery network (CDN) that is distinct from the DCSDS.

11. The method of claim 8, further comprising:
    dynamically allocating the first portion of the limited bandwidth of the data communication link to support playback of recorded video content from the DCSDS; and
    dynamically allocating a second portion of the limited bandwidth of the data communication link to support distribution of live streaming video from the DCSDS.

12. The method of claim 8, wherein determining current bandwidth demand for playback comprises measuring the current bandwidth demand.

13. The method of claim 8, wherein determining current bandwidth demand for playback comprises estimating the current bandwidth demand.

14. The method of claim 8, further comprising:
storing, in the storage architecture, individual copies of recorded video content on a subscriber-by-subscriber basis; and
caching, in the storage architecture, single copies of live streaming video content for distribution to viewing end users.

15. A digital content storage and delivery system (DCSDS) comprising:
a network interface to communicate data between the DCSDS and a destination device via a data communication link having limited bandwidth;
an input interface to receive digital content for handling by the DCSDS; and
a storage architecture to store recorded video content on behalf of subscriber end users for on-demand playback via the data communication link, and to receive live streaming video content for distribution to viewing end users via the data communication link;
wherein the limited bandwidth of the data communication link is shared to support the on-demand playback of the recorded video content and to support distribution of the live streaming video content;
wherein the DCSDS is configured to dynamically allocate a first portion of the limited bandwidth of the data communication link to support the on-demand playback of the recorded video content from the DCSDS, and to dynamically allocate a second portion of the limited bandwidth of the data communication link to support distribution of the live streaming video from the DCSDS.

16. The DCSDS of claim 15, wherein the DCSDS is configured to determine current bandwidth demand for playback of recorded video content stored at the storage architecture, wherein the first and second portions of the limited bandwidth of the data communication link are dynamically allocated based on the determined current bandwidth demand.

17. The DCSDS of claim 16, wherein the DCSDS measures the current bandwidth demand.

18. The DCSDS of claim 16, wherein the DCSDS estimates the current bandwidth demand.

19. The DCSDS of claim 16, wherein the DCSDS is configured to redirect requests for live streaming video content to a content delivery network (CDN) that is distinct from the DCSDS in response to the current bandwidth demand for playback of recorded video content exceeding a threshold demand amount.

20. The DCSDS of claim 15, wherein the DCSDS is configured to receive a live streaming video program via the input interface, and to temporarily cache the received live streaming video program in the storage architecture to accommodate distribution of the received live streaming video program via the data communication link.

* * * * *